US006757846B1

(12) United States Patent
Murray et al.

(10) Patent No.: US 6,757,846 B1
(45) Date of Patent: Jun. 29, 2004

(54) METHOD AND APPARATUS FOR MULTI-BUS BREAKPOINT STEPPING

(75) Inventors: James Murray, Mountain View, CA (US); Jean-Didier Allegrucci, Sunnyvale, CA (US); Jerry Case, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 456 days.

(21) Appl. No.: 09/707,318

(22) Filed: Nov. 6, 2000

(51) Int. Cl.[7] .............................................. G06F 11/00
(52) U.S. Cl. ......................................... 714/34; 710/48
(58) Field of Search ............................. 714/34, 35, 38, 714/39, 28, 29, 47, 43; 710/8, 15, 19, 48, 260, 261, 264

(56) References Cited

U.S. PATENT DOCUMENTS

| 5,012,180 | A | | 4/1991 | Dalrymple et al. | |
|---|---|---|---|---|---|
| 5,047,926 | A | | 9/1991 | Kuo et al. | |
| 5,367,550 | A | * | 11/1994 | Ishida | 377/39 |
| 5,572,667 | A | * | 11/1996 | Ideta | 714/35 |
| 5,717,851 | A | * | 2/1998 | Yishay et al. | 714/25 |
| 5,724,505 | A | * | 3/1998 | Argade et al. | 714/45 |
| 5,737,516 | A | * | 4/1998 | Circello et al. | 714/38 |
| 5,793,776 | A | | 8/1998 | Quershi et al. | |
| 5,812,562 | A | | 9/1998 | Baeg | |
| 5,875,294 | A | * | 2/1999 | Roth et al. | 714/39 |
| 5,896,415 | A | | 4/1999 | Owens et al. | |
| 5,915,083 | A | | 6/1999 | Ponte | |
| 6,026,501 | A | * | 2/2000 | Hohl et al. | 714/38 |
| 6,134,652 | A | | 10/2000 | Warren | |
| 6,331,957 | B1 | * | 12/2001 | Kurts et al. | 365/201 |
| 6,345,298 | B1 | | 2/2002 | Moriya | |
| 6,351,724 | B1 | | 2/2002 | Klassen et al. | |
| 6,408,412 | B1 | | 6/2002 | Rajsuman | |
| 6,425,101 | B1 | | 7/2002 | Garreau | |
| 6,430,727 | B1 | | 8/2002 | Warren | |
| 6,457,108 | B1 | | 9/2002 | Hsu et al. | |
| 6,467,009 | B1 | | 10/2002 | Winegarden et al. | |
| 6,522,985 | B1 | | 2/2003 | Swoboda et al. | |
| 6,557,116 | B1 | * | 4/2003 | Swoboda et al. | 714/28 |
| 6,598,178 | B1 | * | 7/2003 | Yee et al. | 714/34 |

FOREIGN PATENT DOCUMENTS

EP    0 636 976 A1    7/1994

OTHER PUBLICATIONS

IBM Technical Disclosure Bulletin, "Efficient Mechanism for Multiple Debug Modes," vol. 38, No. 11, Nov. 1995, pp. 65–68.

IEEE Standard Test Access Port and Boundary–Scan Architecture, IEEE Std. 1149.1–1990, IEEE Computer Society, Oct. 21, 1993, pp. 1–166.

Supplement to IEEE Std. 1149.1–11990, IEEE Standard Test Access Port and Boundary–Scan Architecture, IEEE Std. 1149.1n–1994, IEEE Computer Society, Mar. 3, 1995, pp. 1–75.

* cited by examiner

*Primary Examiner*—Nadeem Iqbal
(74) *Attorney, Agent, or Firm*—Judith A. Szepesi; Kim Kanzaki; Justin Liu

(57) ABSTRACT

The present invention provides a method for breakpoint stepping a multi-bus device. The multi-bus device includes a breakpoint unit capable of detecting bus events on multiple busses. The breakpoint unit is originally programmed to break on the detection of a specified bus event on a bus selected from multiple busses. After the specified bus event has been detected and the device has entered one of several possible frozen states, the breakpoint unit may be programmed to detect a new bus event on a bus selected from multiple busses. The method is repeated as needed to achieve breakpoint stepping, including single stepping.

26 Claims, 4 Drawing Sheets

METHOD AND APPARATUS FOR MULTI-BUS BREAKPOINT STEPPING

FIELD OF THE INVENTION

The present invention relates to methods of debugging integrated circuits, and more specifically a method of breakpoint stepping.

BACKGROUND

Advances in integrated circuit technology have made it possible to embed an entire system, including a processor core, a memory unit, a high performance bus, and a programmable logic, in a single semiconductor device. This type of programmable semiconductor device is commonly referred to as a system-on-chip (SoC), or a configurable system-on-chip (CSoC). The SoC provides many advantages over traditional processor-based designs. It is an attractive alternative to multi-chip designs because the integration of components into a single device increases overall speed while decreasing size. The SoC is also an attractive alternative to fully customized chips, such as an ASIC (application specific integrated circuit), because ASIC designs tend to have a significantly longer development time and larger development costs.

While the integration of components into a single chip provides many advantages, it often makes debugging chip firmware more difficult. Many of the methods and tools commonly used for debugging processor-based, embedded systems are less effective or simply do not work when the processor is deeply embedded in a chip. For example, logic analyzers and ICEs (in circuit emulators) are often ineffective tools for tracing bus events the processor's address and data busses are not available externally on the chip's I/O (input/output) pins.

The lack of external access to address and data busses has led processor designers to develop on-chip debugging solutions. By adding debug logic to the processor core and making it accessible externally via a serial port, chip designers have made it possible to remotely control execution of a processor with minimal use of the target chip's resources, such as ROM and I/O pins. However, this solution only allows tracing and triggering of a processor's local bus.

New and complex SoCs are being developed with multiple processors and multiple busses. Some new SoC designs have a dedicated processor bus, connecting the processor core to on-chip memory, as well as a peripheral bus, connecting the application specific or programmable logic portion of the chip to the processor core. Prior art solutions do not address such multi-bus systems.

SUMMARY

A method of breakpoint stepping a multi-bus device is disclosed. The method achieves breakpoint stepping, including single stepping, a multi-bus, processor-based device through the use of a multi-bus breakpoint unit.

DETAILED DESCRIPTION

The present invention provides a method for breakpoint stepping a multi-bus device. The method involves programming a multi-bus breakpoint unit to detect a specified bus event on a selected bus. Upon detection of the specified bus event, the multi-bus breakpoint unit asserts a signal causing the device to enter one of several frozen states. While the device is in a frozen state, the breakpoint unit may be reprogrammed to detect a new breakpoint event on a selected bus where the bus may be the same bus or a different bus. Once the breakpoint unit is re-programmed, the device continues execution. The flexibility of the programmable breakpoint unit allows the device to be halted on the next clock cycle or after several cycles. For one embodiment, the break point unit may be programmed to detect a break on each bus cycle, thus permitting break point stepping, e.g. the verification of the status of the system after each command is executed.

Figure 1:
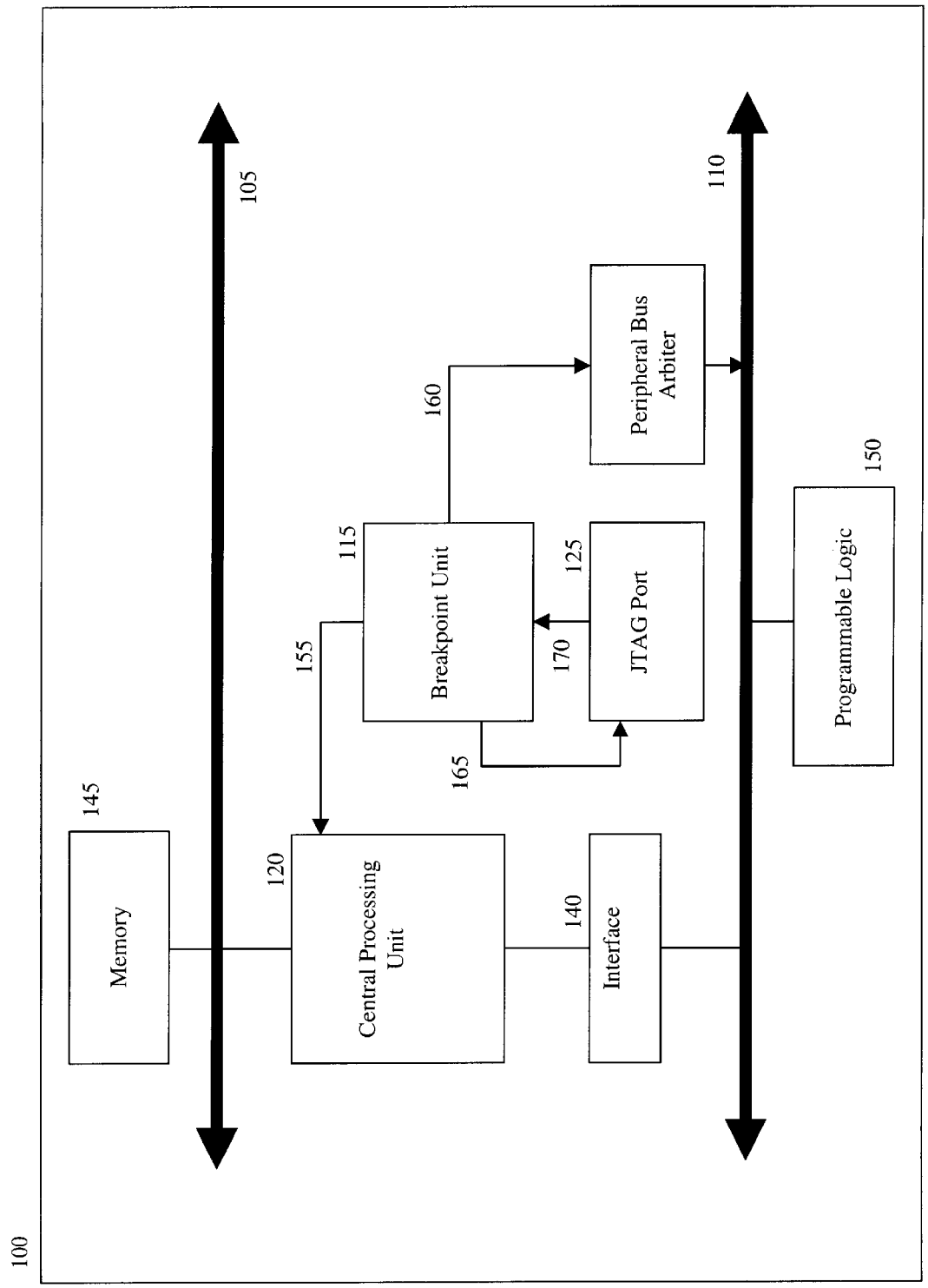
FIG. 1 is a block diagram of one embodiment of a configurable system-on-chip with a multi-bus breakpoint unit.

FIG. 1 is a block diagram of one embodiment of a configurable-system-on-chip 100 with an embedded multi-bus breakpoint unit 115. The breakpoint unit 115 is coupled to a CPU (central processing unit) 120 by a local processor bus 105 and coupled to a programmable logic 150 by a peripheral bus 110. For one embodiment, the CPU 120 is coupled to the programmable logic 150 via an interface 140 and the peripheral bus 110. The CPU, in one embodiment, is coupled to a memory 145 via the local processor bus 105.

The breakpoint unit 115 can be programmed to detect a specified bus event on either the local processor bus 105 or the peripheral bus 110. For one embodiment, the breakpoint unit 115 may be programmed by either the CPU 120 or by an external host debugging system (illustrated in FIG. 4) coupled to the system 100 via the JTAG port 125.

The breakpoint unit 115 has several inputs and outputs. For one embodiment, the breakpoint unit 115 has breakpoint output signals (BP-Output) 155, 160 that are routed to the CPU 120 and the peripheral bus arbiter 130 respectively. For one embodiment, the BP-Output signals 150, 160 may represent CPU-freeze and peripheral bus arbiter freeze signals. The bus arbiter freeze signal instructs the arbiter to not grant the bus to certain bus masters. For one embodiment, the bus arbiter freeze signal may instruct the arbiter to not grant the bus to anyone except the external host debugging system. Other output signals may correspond to other bus controllers.

The breakpoint unit 115 also has breakpoint event signals (BP-Event) 165 which, when asserted, indicate that the breakpoint unit 115 has detected a breakpoint condition. For one embodiment, the BP-Event signal 165 is routed from the breakpoint unit 115 to the JTAG port 125.

For one embodiment, the breakpoint unit 115 has a JTAG breakpoint signal (JTAG-BP) 170 that is driven from the JTAG port 125 to the breakpoint unit 115. The purpose of the JTAG-BP signal 170 is to hold the BP-Output signal(s) asserted while the BP-Event signal 165 is cleared, allowing the breakpoint unit 115 to be reprogrammed while the system 100 is in a frozen state. This permits breakpoint stepping, as will be described in more detail below.

Figure 2:
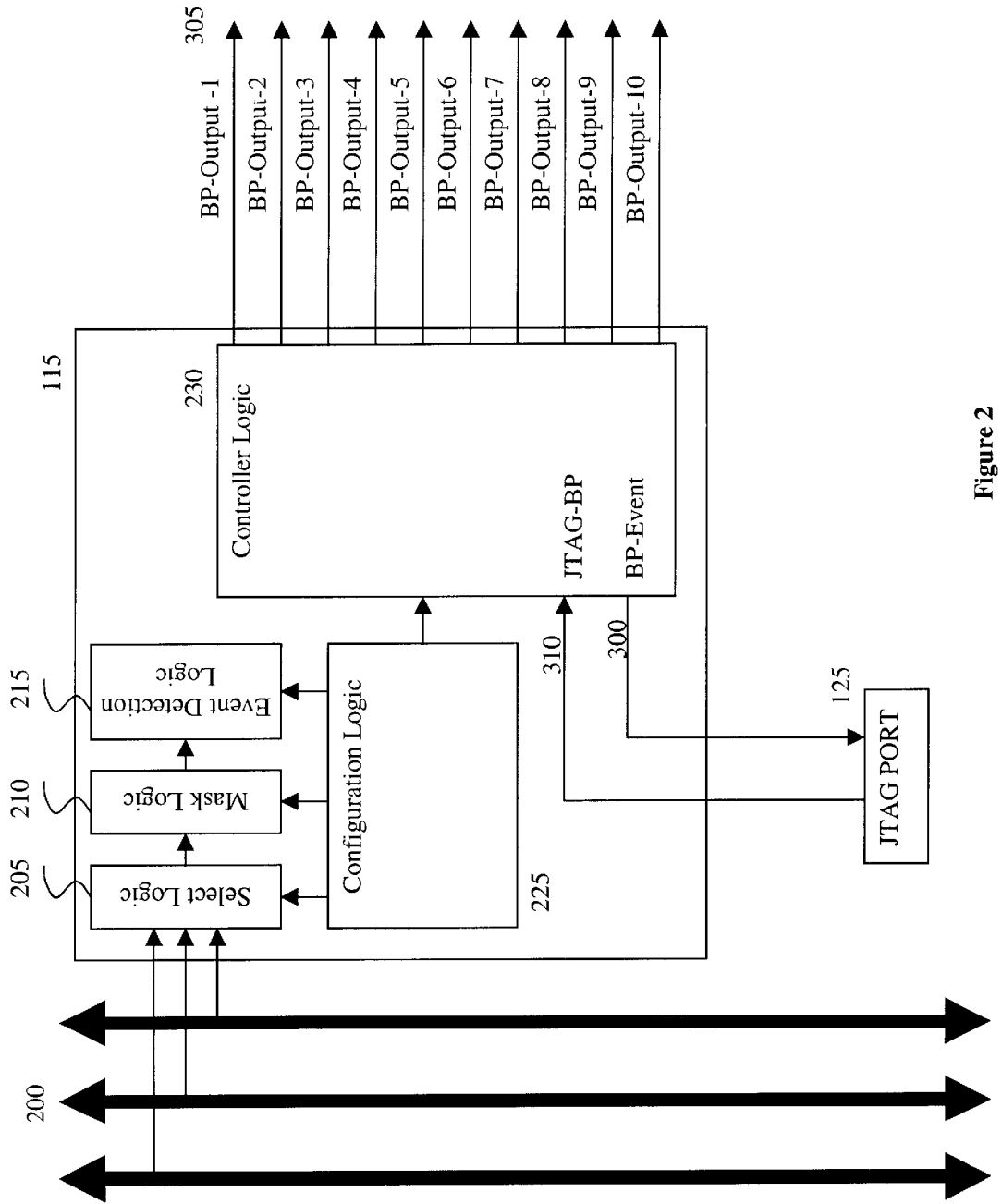
FIG. 2 is a block diagram of one embodiment of a multi-bus breakpoint unit.

FIG. 2 is a block diagram of one embodiment of a multi-bus breakpoint unit 115. In this particular embodiment, the breakpoint unit 115 includes a bus select logic 205 that selects one of the busses 200 to monitor, based on the programming of the configuration logic 225. While FIG. 2 includes three busses, one skilled in the art will realize that the method of breakpoint stepping described is independent of the number of busses.

For one embodiment, the mask logic 210 masks bits of the selected bus data based on the programming of the configuration logic 225. After the bus is masked, the event detection logic 215 compares the masked bus data to the breakpoint conditions specified in the configuration logic 225. This is described in more detail below and in the application entitled "A Universal Multi-Bus Breakpoint Unit For A Configurable System-On-Chip," U.S. patent application Ser. No. 09/707,459, filed Nov. 6, 2000.

Upon detection of a specified bus event programmed into the configuration logic 225, the controller logic 230 generates a BP-Event signal 165 as well as one or more BP-Output signals 305. The BP-Event signal 165 indicates that a breakpoint condition has occurred. For one embodiment, the BP-event signal 165 may be routed to the JTAG port 125 so that it is available to an external host debugging system (illustrated in FIG. 4). When the host debugging system detects the BP-event signal 165, the host debugging system may assert a JTAG-BP signal 170 via the JTAG port 125. The JTAG BP signal 170 is routed to the breakpoint unit's controller logic 230.

Referring again to FIG. 2, ten different BP-Output signals 305 are shown, BP-Output 1 to BP-Output 10. A breakpoint condition could result in the assertion of one or more of the BP-Output signals 305, depending on the programming of the configuration logic 225. Each BP-Output signal 305 represents an action that is taken in response to the detection of a breakpoint. For example, one of the BP-Output signals 305 may present a CPU-freeze signal, and another a peripheral-bus-arbitration-freeze signal. One skilled in the art will recognize that any number of BP-Output signals 305 may be used to achieve different results. Although the BP-Output signals 305 are illustrated as separate connections, one skilled in the art would understand that there may be a single connection, or a number of connections corresponding to the number of busses in the system, and that multiple BP-Output signals 305 may be sent over a single connection.

Figure 3:
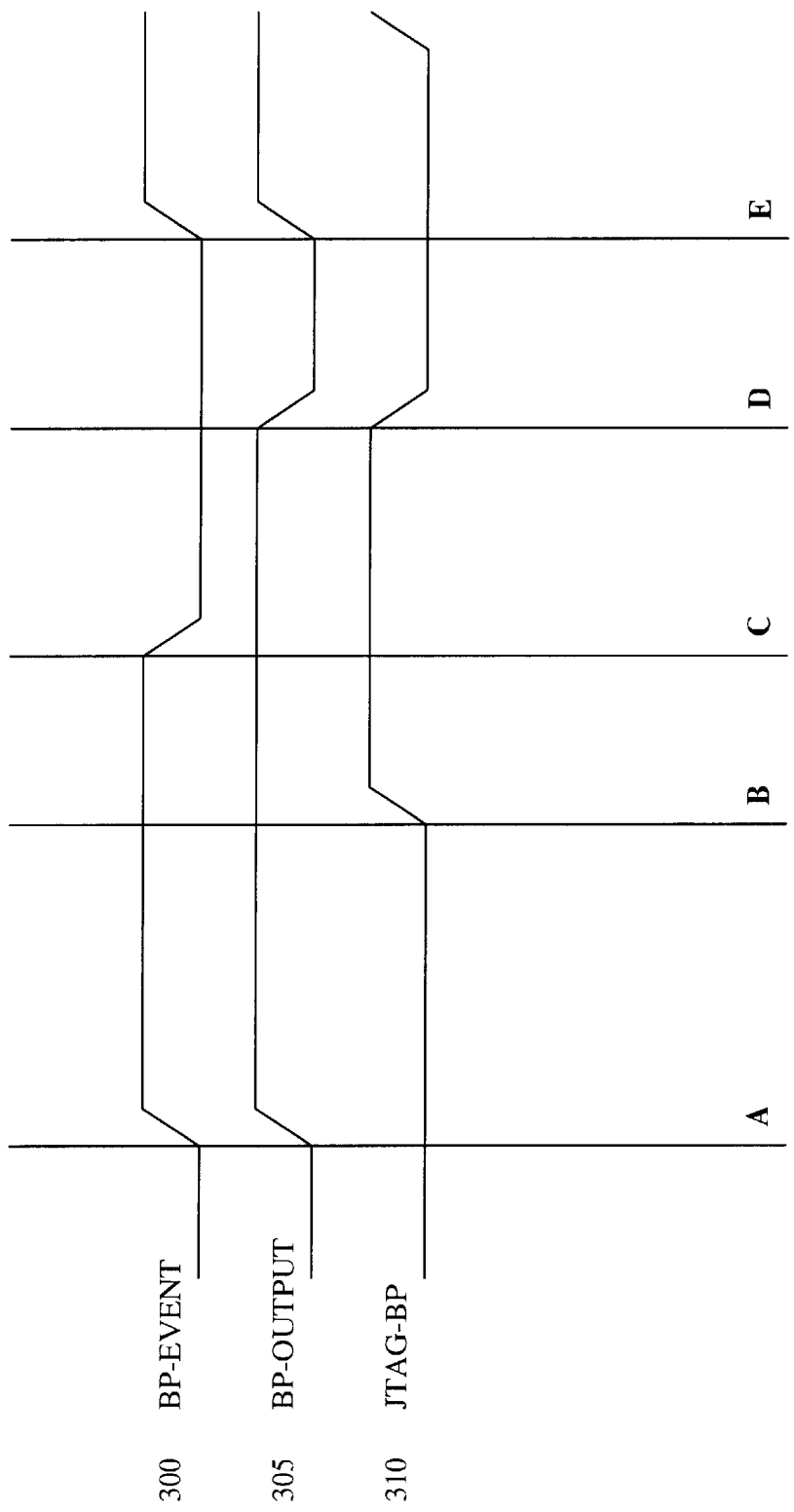
FIG. 3 is a signal timing diagram for one embodiment of a multi-bus breakpoint unit.

FIG. 3 is a signal-timing diagram illustrating the interaction in time of the three signals, the BP-event signal 165, the BP-Output signal 305, and the JTAG-BP signal 170. The vertical line labeled A represents the point in time at which a first breakpoint condition is detected, e.g., the time at which the event detection logic 215 detects a matching bus event. At point A, when a breakpoint even is detected, the BP-Event signal 165 is asserted. This causes the BP-Output signal 305, which is slaved to the BP-event signal 165, to be asserted as well. For one embodiment, both the BP Event signal 165 and the BP-Output signal 305 are active high. For one embodiment, the BP-Event signal 165 is routed to the JTAG port 125 indicating to a host debugging system (not shown) that a breakpoint condition has occurred.

For one embodiment the BP-Output signal 305 is routed to a CPU 120 or peripheral bus arbiter 130. For one embodiment, the assertion of the BP-Output signal 305 results in the CPU 120 halting execution, and/or the freezing of the peripheral bus arbiter 110.

At point B, the external host debugging system (not shown) has asserted the JTAG-BP signal 170. This occurs when the external host debugging system wishes to control the breakpoint unit. For one embodiment, the JTAG-BP signal 170 is routed to the breakpoint unit via the JTAG port 125.

While the JTAG-BP signal 170 is asserted, the BP-Output signal 305 is held asserted. In general, the BP-Output signal 305 parallels the BP-Event signal 165. However, when the JTAG-BP signal 170 is asserted, the BP-Output signal 305 is forced to remain asserted, regardless of the state of the BP-Event signal 165. As a consequence, the BP-Event signal 165 may be cleared while the BP-Output signal 305 remains asserted. This is shown at point C. Since the BP-Output signal 305 is used to control the portions internal to the chip, such as the CPU and/or bus arbiter, the chip can remain frozen while the BP-Event signal is cleared. This permits the reprogramming of the breakpoint unit by the external host debugging system.

At point D, after the breakpoint unit has been reprogrammed, the host debugging system 400 clears the JTAG-BP signal 170. In response, the BP-Output signal 305 is deasserted, following the BP-Event signal 165. Thus, at this point, the system is unfrozen. For one embodiment, the CPU 120 resumes execution. For another embodiment, the peripheral bus arbiter is unfrozen, and the system resumes function. At point E, a second breakpoint is detected and the cycle is repeated.

Figure 4:
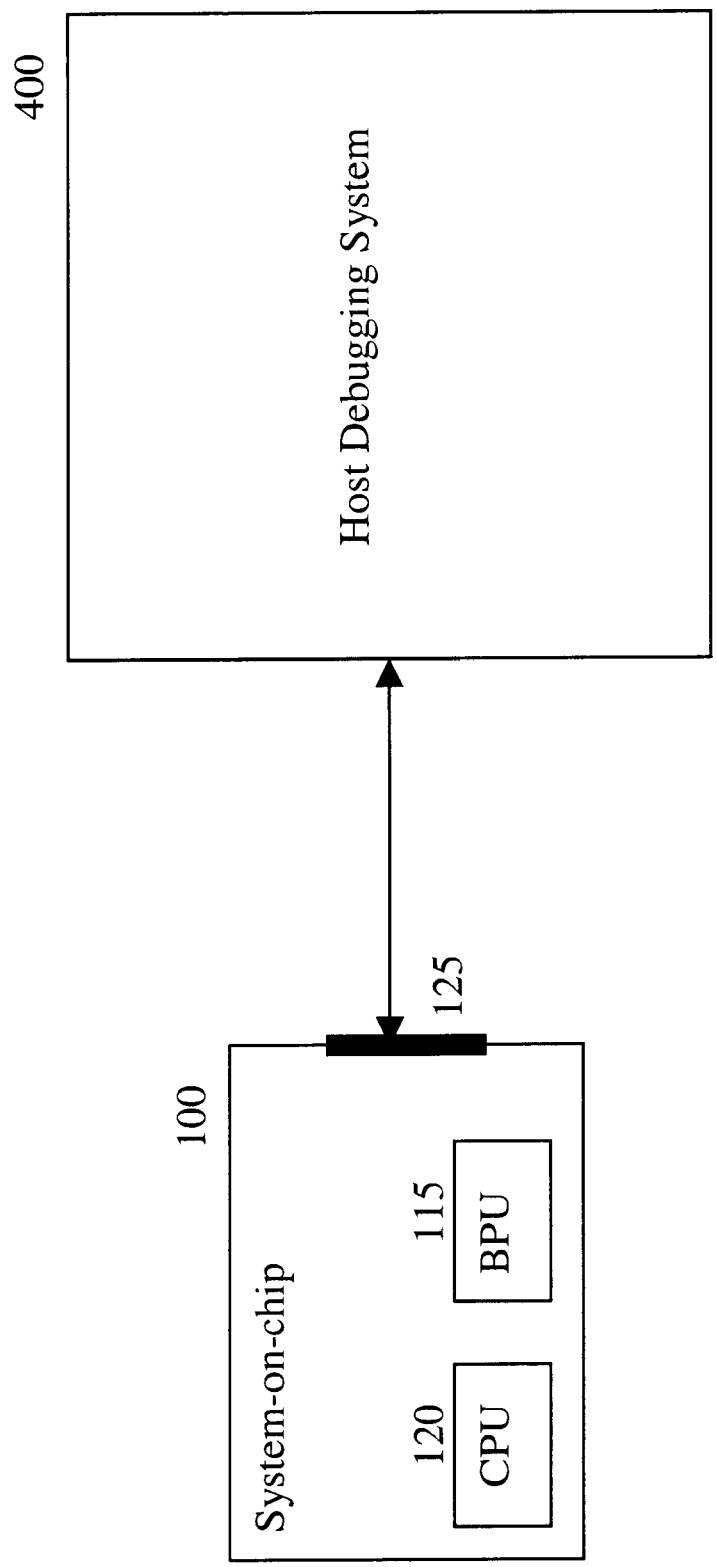
FIG. 4 is a block diagram of one embodiment of a multi-bus device with multi-bus breakpoint unit connected with a host debugging system.

FIG. 4 illustrates how the multi-bus device can be attached to a host debugging system via the JTAG port 125. For one embodiment, the host debugging system 400 controls the programming of the breakpoint unit 115. For one embodiment, the breakpoint unit 115 may be programmed by the CPU, by the host debugging system 400, or by another device inside or outside of the circuit.

For one embodiment, the JTAG-BP signal 170 is generated by the host debugging system 400 in response to the BP-Event signal 165. The JTAG-BP signal 170, while asserted, holds the BP-Output signal 305 asserted, thereby keeping the device in a frozen state while the breakpoint unit 115 is reprogrammed by the host debugging system 400. When the JTAG-BP signal 170 is cleared, the BP-Output signal 305 is deasserted, and the device resumes executing instructions.

For one embodiment, the host debugging system 400 also serves as a user interface to analyze the state of the multi-bus system 100. For one embodiment, while the multi-bus system is in a frozen state, various system characteristics can be analyzed. The host debugging system 400 can access the data in the breakpoint unit 115, and can access all registers that may contain information about the state of the system. For one embodiment, the host debugging system 400 can use the peripheral bus to access various portions of the system. In this way, while the system is frozen, the state of the system may be analyzed, prior to reprogramming the breakpoint unit 115.

Thus, the system permits the single stepping of a device that includes a breakpoint unit. For one embodiment, the breakpoint unit may be able to detect breakpoints on multiple busses. The breakpoint unit may be reprogrammed to detect each successive bus event, such that the system is forced into a single-stepping mode. Alternatively, certain events may be detected, such as memory accesses. By using a host debugging system which can reprogram the breakpoint unit on the fly, e.g. during use, the breakpoint unit can be updated without unfreezing the CPU. This is advantageous because it preserves the state of the CPU, which may be useful in analyzing the system. Furthermore, by not placing breakpoint unit programming data on the bus, the data detected by an external host debugging system is not contaminated with irrelevant information.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded in an illustrative rather than in a restrictive sense.

What is claimed is:

1. A method of using a breakpoint unit in a system-on-chip (SoC) comprising:
   asserting a breakpoint signal when a breakpoint is detected;
   notifying an external host debugging system coupled to the SoC using the breakpoint signal;
   asserting a freeze signal to freeze processing in at least one portion of the SoC;
   receiving a reprogram signal from the external host debugging system, maintaining the freeze signal, and permitting deassertion of the breakpoint signal, to permit reprogramming of the breakpoint unit.

2. The method of claim 1, wherein the breakpoint signal controls the freeze signal, such that the breakpoint signal causes the freeze signal to be asserted, and when the breakpoint signal is deasserted, the freeze signal is deasserted, unless the freeze signal is maintained by the reprogram signal.

3. The method of claim 1, further comprising:
   reprogramming the breakpoint signal using the external host debugging system, while the reprogram signal maintains the SoC in a freeze state.

4. The method of claim 3, wherein reprogramming includes identifying a new breakpoint.

5. The method of claim 4, wherein identifying a new breakpoint permits stepping of the system.

6. The method of claim 1, wherein the freeze signal freezes processing in the processor (CPU) of the SoC.

7. The method of claim 6, wherein the CPU is generally used to program the breakpoint unit, and wherein using the reprogram signal to externally program the breakpoint unit bypasses the CPU.

8. The method of claim 1, wherein the freeze signal freezes a peripheral bus arbiter.

9. The method of claim 1, wherein the external host debugging system is directly coupled to the breakpoint unit through a port.

10. The method of claim 9, wherein the port is a Joint Test Action Group (JTAG) compliant port.

11. A breakpoint unit in a system-on-chip (SoC) comprising:
    an event detection logic to detect a breakpoint event;
    a breakpoint action logic to identify an action associated with the breakpoint event;
    a controller logic to perform the action associated with the breakpoint event;
    a notification logic to send a notification of the breakpoint event to an external host debugging device; and
    a reaction logic to enable the controller to continue performing the action associated with the breakpoint event in response to an EHDD signal, after the breakpoint signal is deasserted.

12. The breakpoint unit of claim 11, further comprising:
    a connection to a plurality of busses on which breakpoints may be detected.

13. The breakpoint unit of claim 11, further comprising:
    a configuration logic to identify the breakpoint event, which is detected.

14. The breakpoint unit of claim 13, wherein the configuration logic is reprogrammable by the external host debugging device.

15. The breakpoint unit of claim 14, wherein the external host debugging device may reprogram the breakpoint unit while the SoC is kept frozen by the reaction logic.

16. The breakpoint unit of claim 11, wherein the action associated with the breakpoint event is to freeze a processor (CPU) of the SoC.

17. The breakpoint unit of claim 11, wherein the action associated with the breakpoint event is to program a peripheral bus arbiter to refuse access to an element coupled to the peripheral bus.

18. The breakpoint unit of claim 11, further comprising a status logic to gather data of a state of the SoC, to permit analysis of the SoC at the breakpoint.

19. The breakpoint unit of claim 18, wherein the status logic is accessible by the external host debugging system.

20. The breakpoint unit of claim 11, wherein the external host debugging system is directly coupled to the breakpoint unit using a port.

21. The breakpoint unit of claim 20, wherein the port is a Joint Test Action Group (JTAG) compliant port.

22. The breakpoint unit of claim 11, wherein reprogramming the breakpoint unit using the host external debugging system permits breakpoint stepping.

23. A method of debugging of a system-on-chip (SoC) including a breakpoint unit, the method comprising:
    asserting a breakpoint event signal in response to detecting a breakpoint;
    notifying an external host debugging system of a breakpoint by sending the breakpoint event signal;
    generating a freeze signal in response to the breakpoint event signal, the freeze signal slaved to the breakpoint event signal, the freeze signal freezing a portion of the SoC, to permit analysis at the breakpoint;
    receiving a reprogram signal from the external host debugging system, the reprogram signal forcing the freeze signal to remain asserted, while the breakpoint event signal is deasserted and the breakpoint unit is reprogrammed by the external host debugging system.

24. The method of claim 23, wherein the freeze signal freezes processing in a CPU of the SoC.

25. The method of claim 23, wherein the freeze signal freezes a peripheral bus arbiter to refuse access to a peripheral bus.

26. A method of breakpoint stepping a multi-bus system with a multi-bus breakpoint unit, comprising:
    programming the multi-bus breakpoint unit to detect a first specified bus event on a bus selected from multiple busses;
    freezing the state of the multi-bus system upon the detection of the specified bus event on the selected bus;
    reprogramming the multi-bus breakpoint unit to detect a second specified bus event on a bus selected from multiple busses while the system is in a frozen state;
    taking the system out of the frozen state once the multi-bus breakpoint unit has been re-programmed.

* * * * *